July 17, 1928.  1,677,341
P. M. HENGSTENBERG
ELECTRODE FOR EVACUATED ELECTRIC DEVICES
Filed Oct. 7, 1921

WITNESSES:

INVENTOR
Paul M. Hengstenberg
BY
ATTORNEY

Patented July 17, 1928.

1,677,341

UNITED STATES PATENT OFFICE.

PAUL M. HENGSTENBERG, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRODE FOR EVACUATED ELECTRIC DEVICES.

Application filed October 7, 1921. Serial No. 506,157.

My invention relates to evacuated electric devices and particularly to an improved type of anode structure employed in such devices.

An object of my invention is to provide an anode structure of improved design, whereby the parts of the anode may be stamped and shaped in one operation in a suitable machine for quantity production.

According to my invention, I provide an electrode comprising two side-by-side metal-plate members having spaced portions intermediate opposite edges. Each plate member is provided with pairs of tabs or lugs which extend in opposite directions therefrom. The tabs are of such length as to admit of their being wound around pivot rods to form hinge connections. The pivot rods may be so extended as to admit of their serving as supporting rods for the electrode. In addition, the plate members may be further provided with transverse stiffening ribs integral with said members.

Other objects of my invention, as well as details of construction, whereby my invention may be practised, will be apparent from the following description, when read in connection with the accompanying claims and drawing wherein:

Figure 1:
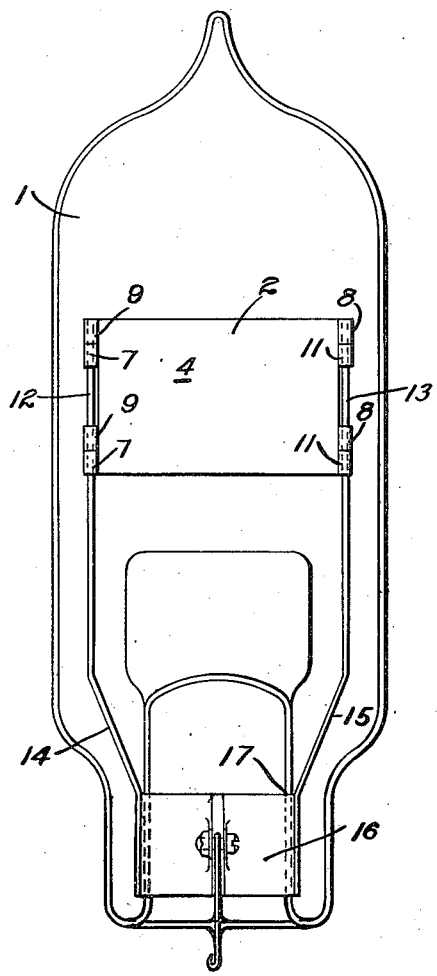
Figure 1 is a front elevational view of a partly completed evacuated electric device employing an electrode embodying my invention.

In Fig. 1, is shown a partly completed evacuated electric device of well-known form comprising a containing envelope 1, an anode 2 and means for supporting said anode, the remaining elements pertaining to such devices being omitted in order to simplify the description of my invention.

Figure 3:
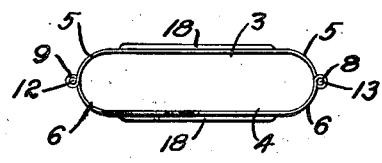
Fig. 3 is a top-plan view of the completed electrode.

The anode 2 comprises a pair of parallel plate members 3 and 4 having inwardly-bent end portions 5 and 6 forming a flat tubular structure, as illustrated in Fig. 3. The ends of the plate members 3 and 4 are provided with integral tabs or lugs 7, 7 and 8, 8 and 9, 9 and 11, 11, respectively. The tabs 7, 9 and 8, 11, respectively, are curved around pivot rods 12, 13 to form hinged connections, the pivot rods being extended to serve as supporting members 14 and 15. The ends 14 and 15 of the pivot rods 12 and 13 may be secured to a clamping device 16 which embraces a re-entrant stem portion 17 of the tube 1.

Figure 2:
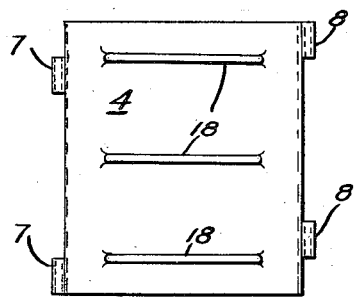
Fig. 2 is a front elevational view of one of the pairs of plate members constituting the electrode embodying my invention, in a slightly modified form employing transverse stiffening ribs.

The plate members 3 and 4, which constitute the anode 2, may be provided with transverse ribs 18, as shown in Figs. 2 and 3, which serve to stiffen the plate members. Such reinforcing means may be necessary in high-potential tubes, inasmuch as, otherwise, the electrostatic forces may be of such value as to buckle the plate members.

While I have shown only one embodiment of my invention in the accompanying drawing, it is susceptible of various changes and modifications without departing from its spirit, and I desire, therefore, that only such limitations shall be imposed thereon as are indicated in the claims or are demanded by the prior art.

I claim as my invention:

1. In an evacuated electric device, an electrode comprising a plurality of sheet-metal plate members and means, including pivot pins, whereby the opposite edges of one member may be hinge-connected to the corresponding edges of another member, said pivot pins also serving as supporting rods for said electrode.

2. In an evacuated electric device, an electrode comprising a pair of side-by-side plate members having spaced portions and carrier rods, opposite ends of one member having openings disposed substantially in alinement with the openings in the corresponding ends of the remaining member for receiving said carrier rods, whereby said plate members may be supported and electrically connected.

3. An anode structure comprising a plurality of plates provided with edge extensions bent upon themselves to form loops, the loops of one plate being offset with reference to the loops of another plate, and pintles passing through said loops.

4. In a device of the character described, a substantially tubular electrode structure comprising a plurality of plates having hinge lugs at the edges thereof, pintles for supporting said plates, said plates being held in edge to edge relationship by pintles passing through said lugs.

In testimony whereof, I have hereunto subscribed my name this 30th day of September, 1921.

PAUL M. HENGSTENBERG.